US010949261B2

(12) United States Patent
Yang

(10) Patent No.: US 10,949,261 B2
(45) Date of Patent: Mar. 16, 2021

(54) AUTOMATED RESOURCE PROVISIONING USING DOUBLE-BLINDED HARDWARE RECOMMENDATIONS

(71) Applicant: Intel Corporation, Santa Clara, CA (US)

(72) Inventor: Shao-Wen Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 16/367,120

(22) Filed: Mar. 27, 2019

(65) Prior Publication Data
US 2019/0220321 A1 Jul. 18, 2019

(51) Int. Cl.
*G06F 9/50* (2006.01)
*G06F 9/48* (2006.01)
*H04L 12/24* (2006.01)

(52) U.S. Cl.
CPC .......... *G06F 9/5038* (2013.01); *G06F 9/4881* (2013.01); *G06F 9/505* (2013.01); *G06F 9/5072* (2013.01); *H04L 41/0806* (2013.01); *H04L 41/0896* (2013.01); *H04L 41/12* (2013.01); *G06F 2209/506* (2013.01); *G06F 2209/5017* (2013.01)

(58) Field of Classification Search
None
See application file for complete search history.

(56) References Cited

U.S. PATENT DOCUMENTS

2009/0055684 A1* 2/2009 Jamjoom ............ H04L 41/5074
714/26
2014/0297833 A1* 10/2014 Bedini ................ H04L 43/0876
709/224

OTHER PUBLICATIONS

Batista et al. ("Self-adjustment of resource allocation for grid applications"; Computer Networks 52; 2008; pp. 1762-1781) (Year: 2008).*
Lee et al. ("Topology-Aware Resource Allocation for Data-Intensive Workloads", ACM; 2010; pp. 1-5) (Year: 2010).*

* cited by examiner

*Primary Examiner* — Eric C Wai
(74) *Attorney, Agent, or Firm* — Alliance IP, LLC

(57) ABSTRACT

In one embodiment, an apparatus comprises a communication interface to communicate over a network, and a processor. The processor is to: receive a workload provisioning request from a user, wherein the workload provisioning request comprises information associated with a workload, a network topology, and a plurality of potential hardware choices for deploying the workload over the network topology; receive hardware performance information for the plurality of potential hardware choices from one or more hardware providers; generate a task dependency graph associated with the workload; generate a device connectivity graph associated with the network topology; select, based on the task dependency graph and the device connectivity graph, one or more hardware choices from the plurality of potential hardware choices; and provision a plurality of resources for deploying the workload over the network topology, wherein the plurality of resources are provisioned based on the one or more hardware choices.

25 Claims, 11 Drawing Sheets

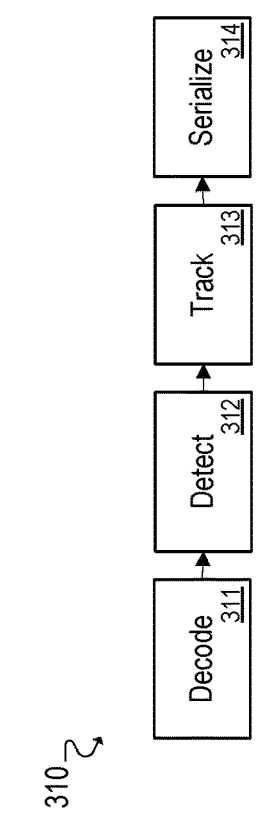
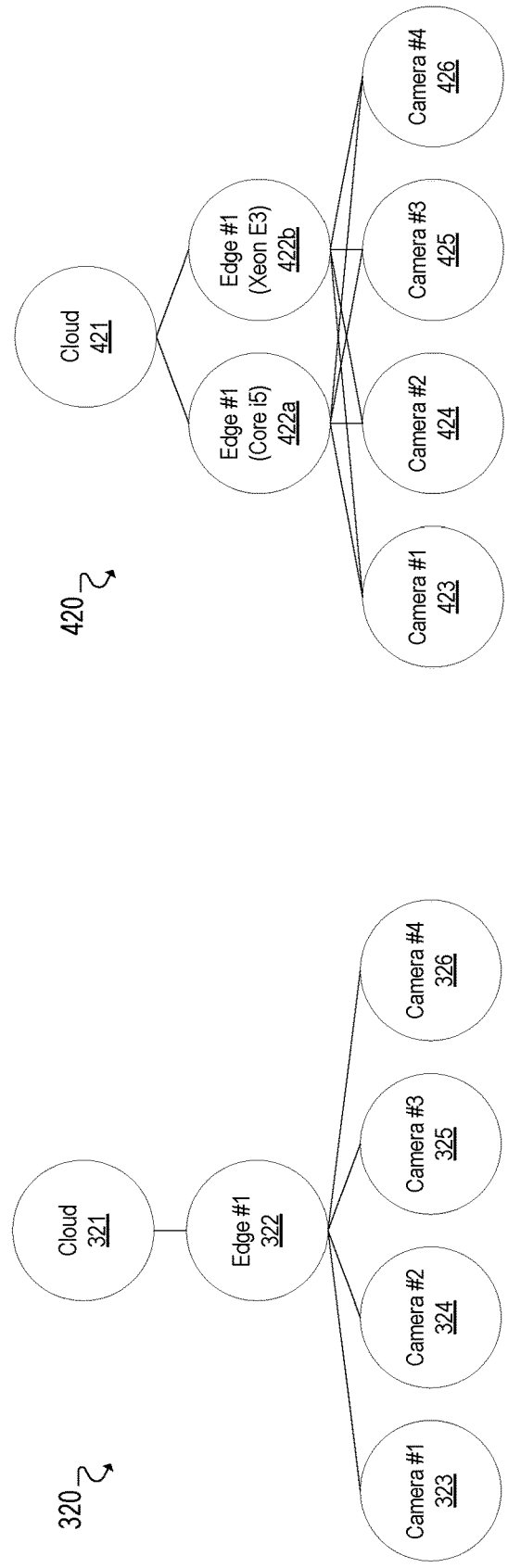

AUTOMATED RESOURCE PROVISIONING USING DOUBLE-BLINDED HARDWARE RECOMMENDATIONS

FIELD OF THE SPECIFICATION

This disclosure relates in general to the field of distributed computing, and more particularly, though not exclusively, to automated hardware recommendations and resource provisioning.

BACKGROUND

Deploying workloads in a distributed computing system has become a ubiquitous yet daunting task. Accordingly, before deploying or scaling workloads, many users ask their hardware providers to provide hardware recommendations for specific deployments of specific workloads and/or applications. The major challenge of this practice, however, lies in the blindness of users and hardware providers with respect to each other's confidential and/or proprietary information. For example, many users do not share their workloads with hardware providers, or they only share their workloads as "blackboxes" rather than "whiteboxes." Moreover, many hardware providers do not share hardware resource capacity and performance measures for workloads unless they are fully optimized, but optimizing every workload beforehand is unrealistic.

This "blindness" creates a dilemma with respect to evaluating and recommending hardware for workload deployment and resource provisioning purposes. For example, it is challenging to identify the optimal computing hardware for a workload without having information regarding the workload implementation as well as the hardware performance capabilities. Moreover, this becomes even more challenging in a distributed edge-to-cloud deployment due to the outstanding degrees of freedom in optimization.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 3A-B illustrate examples of workload and network topology graphs.

FIGS. 4A-B illustrate examples of expanded workload and network topology graphs with multiple hardware choices.

EMBODIMENTS OF THE DISCLOSURE

Figure 1:
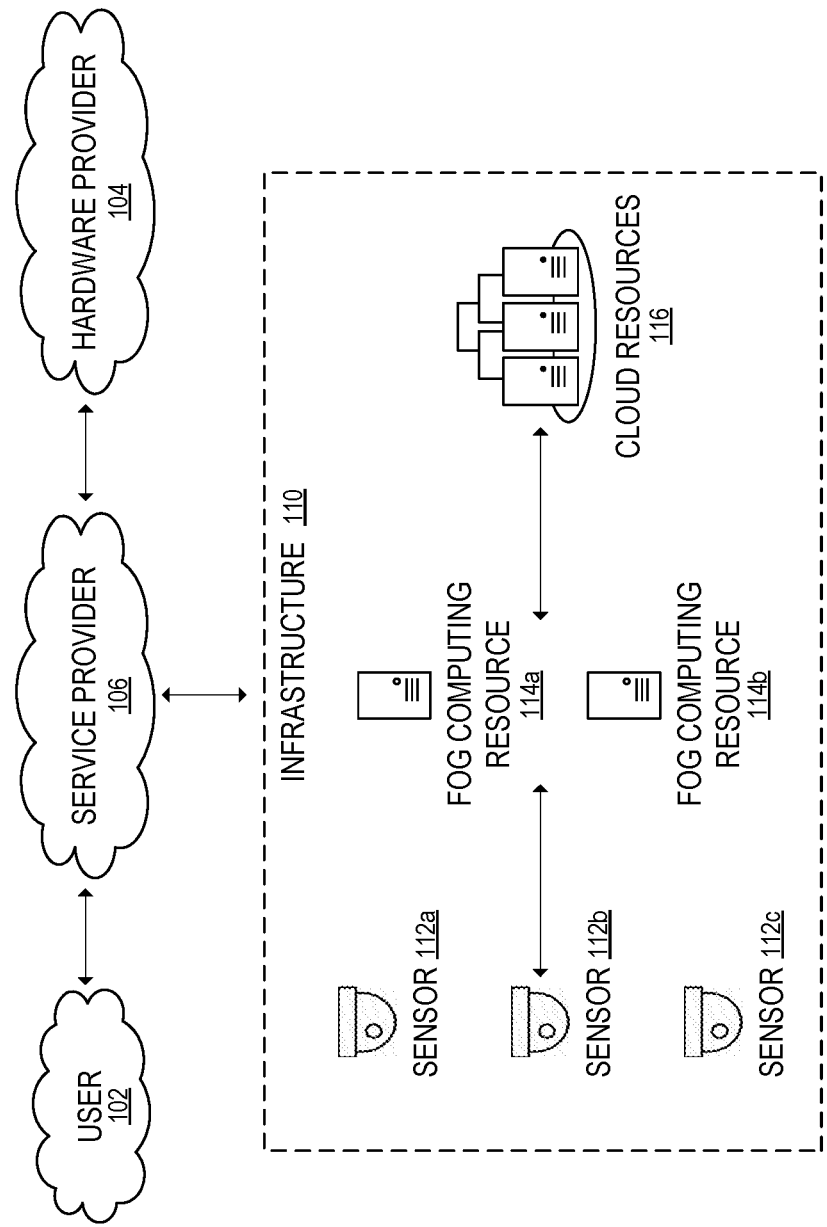
FIG. 1 illustrates an example of a distributed computing system that performs automated resource provisioning using double-blinded hardware recommendations.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Automated Resource Provisioning Using Double-Blinded Hardware Recommendations

Deploying workloads in a distributed computing system, such as computer vision or deep learning workloads, has become a ubiquitous yet daunting task. In particular, workloads can vary from one application to another and the resource requirements of each workload can vary from one deployment to another. Further, the existing infrastructure of a distributed computing system cannot simply be replicated due to the complexity of the workloads and the desire to lower the total cost of ownership (TCO).

Accordingly, prior to provisioning resources for a workload (e.g., placing hardware orders, deploying hardware, provisioning virtual machines), many users and entities ask their hardware providers to provide hardware recommendations for each specific deployment of each specific application.

The major challenge of this practice, however, lies in the blindness of users and hardware providers with respect to each other's confidential and/or proprietary information. For example, many users do not share their workloads with hardware providers, or alternatively, the users may only share their workloads as "blackboxes" rather than "whiteboxes." Moreover, hardware providers typically do not share hardware resource capacity and performance measures for whitebox workloads unless they are fully optimized, but optimizing every whitebox workload a priori is unrealistic.

This "blindness" creates a dilemma with respect to evaluating and recommending hardware for resource provisioning purposes, however, which is already extremely challenging in a distributed edge-to-cloud deployment due to the outstanding degrees of freedom in optimization. Thus, there are no existing solutions capable of performing automated end-to-end (E2E) resource provisioning across optimal hardware selections, without jeopardizing proprietary information of users and hardware providers.

Accordingly, this disclosure presents various embodiments for performing automated E2E resource provisioning using double-blinded hardware recommendations, as described further below.

FIG. 1 illustrates an example of a distributed computing system 100 that performs automated end-to-end (E2E) resource provisioning using double-blinded hardware recommendations. In the illustrated example, computing system 100 includes the respective computing environments of a user 102, hardware provider 104, and service provider 106, along with an edge-to-cloud computing infrastructure 110 for deploying workloads of the user 102.

The user 102 may include any entity that deploys workloads on the computing infrastructure 110, such as an independent software vendor (ISV) or system integrator (SI).

The hardware provider 104 may include any vendor of computing hardware that could potentially be deployed as part of the computing infrastructure 110, such as an original equipment manufacturer (OEM) (e.g., Intel, AMD, ARM, NVIDIA, Qualcomm, Google) of computing platforms and appliances, general-purpose processors, special-purpose processors and accelerators (e.g., GPUs, FPGAs, ASICs), memory and storage devices, sensors, and so forth.

The service provider 106 may include any entity that provides automated hardware recommendations and/or resource provisioning for workloads that are deployed on the computing infrastructure 110. In some embodiments, the service provider 106 may be an entity that owns and operates some or all of the end-to-end (E2E) infrastructure 110 as a service (e.g., Infrastructure-as-a-Service (IaaS)), such as a cloud service provider (CSP) (e.g., Amazon, Google, Microsoft).

The computing infrastructure 110 may include a collection of computing resources that provides an end-to-end (E2E) environment for executing workloads. In some embodiments, for example, the computing infrastructure 110 may be distributed throughout an edge-to-cloud environment (referred to as the "fog"). In the illustrated embodiment, the computing infrastructure 110 includes a collection of sensors 112a-c (e.g., cameras), fog computing resources 114a-b, and cloud computing resources 116.

When deploying a workload on the computing infrastructure 110, the service provider 106 can perform automated hardware recommendations and/or resource provisioning in an E2E manner, without compromising any confidential or proprietary information of the user 102 or hardware provider 104. For example, the service provider 106 can perform an automated method for E2E resource provisioning using double-blinded hardware recommendations, which can be designed to minimize the total cost of ownership (TCO) and/or maximize workload performance, while ensuring that the user 102 and hardware provider 104 remain "blind" to any confidential information that the other provides in connection with the hardware recommendations. In this manner, the service provider 106 provides optimal E2E hardware recommendations for workloads as a blackbox, without any human intervention, thus protecting any confidential and/or proprietary information of the user 102 and hardware provider 104.

In the illustrated embodiment, the automated E2E resource provisioning is performed using a novel hardware recommendation algorithm that leverages integer linear programming (ILP) to guarantee that optimal hardware recommendations are provided. Moreover, the hardware recommendations can be generated without human intervention using a client-server architecture that is collocated and/or operated by a third party (e.g., a third-party service provider 106), thus ensuring double-blindness of the user 102 and the hardware provider 104 with respect to each other's confidential or proprietary information.

The proposed solution provides numerous advantages. For example, the hardware recommendations and resource provisioning are provided for the computing infrastructure 110 on an edge-to-edge (E2E) basis rather than for single devices in isolation. In particular, this solution can take into account constraints among devices from edge to cloud, along with workloads that are designed for heterogeneous processors and hardware accelerators, and provides hardware recommendations across all devices from edge to cloud. Moreover, the algorithm used in this solution leverages integer linear programming (ILP) to guarantee that the hardware recommendations are optimal.

Further, the hardware recommendations and resource provisioning are performed automatically, without any human intervention, and in a secure manner. For example, the proposed solution addresses the confidentiality of both parties involved (e.g., the user 102 and the hardware provider 104) without relying on any human operators. In some embodiments, for example, the proposed solution runs on a secure server and takes into account various inputs from the user 102 and/or hardware provider 104, such as whitebox and blackbox workloads and performance measures, and then provides optimal hardware recommendations for automated resource provisioning. In this manner, the confidentiality of the workloads is preserved due to the automation and lack of human intervention, while whitebox performance measures and other confidential information of the participating parties (e.g., user 102 and/or hardware provider 104) reside exclusively on the third-party server (e.g., service provider 106) and thus are not revealed to the other participating party.

Figure 2:
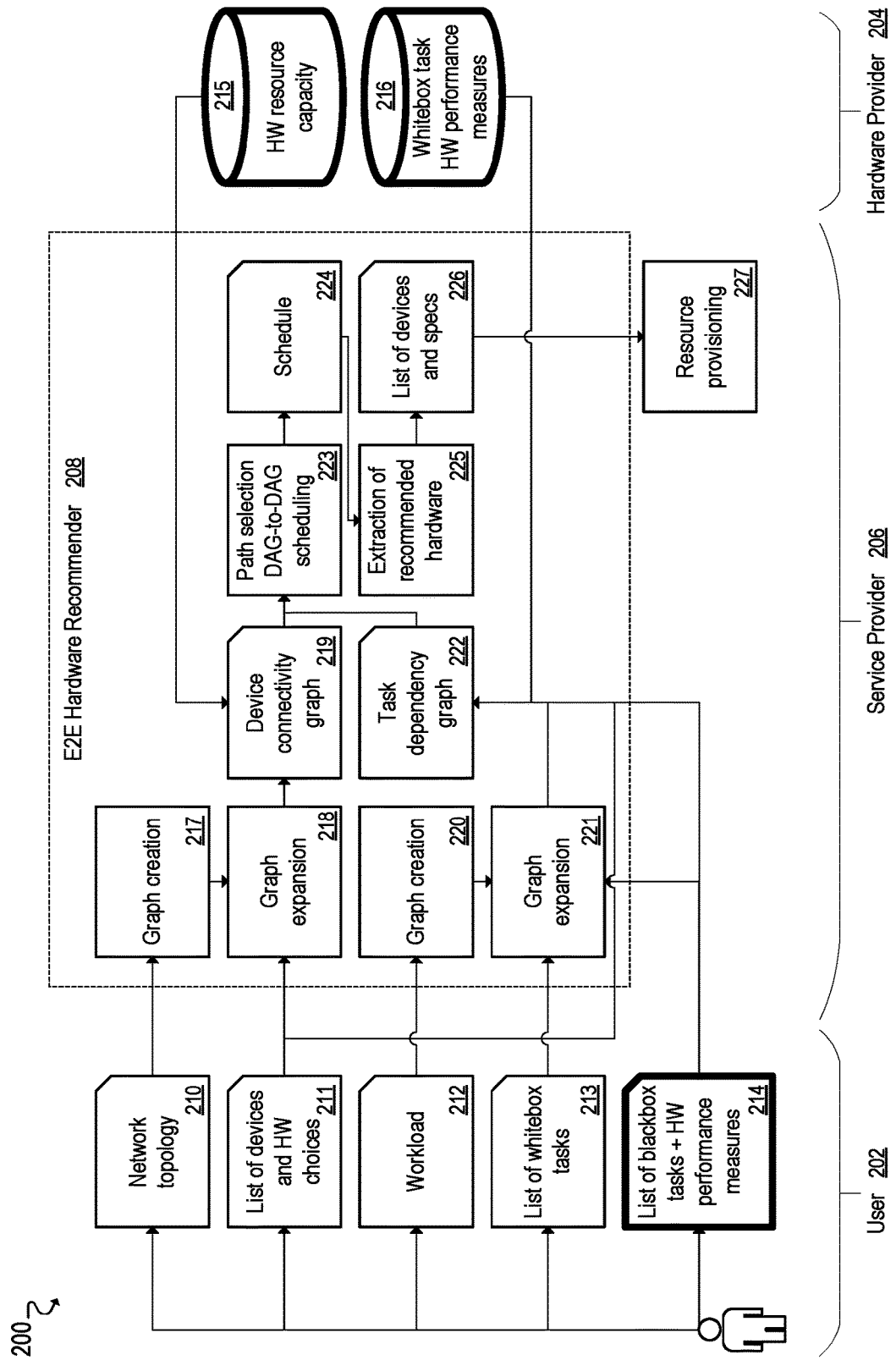
FIG. 2 illustrates an example process flow for performing automated resource provisioning using double-blinded hardware recommendations.

FIG. 2 illustrates an example process flow 200 for performing automated resource provisioning using double-blinded hardware recommendations. In some embodiments, for example, the hardware recommendations and/or resource provisioning may be provided for workloads that are to be deployed in an end-to-end (E2E) computing environment, such as an edge-to-cloud infrastructure.

In the illustrated example, the process flow 200 is collectively performed by three entities: a user 202, a hardware provider 204, and a service provider 206. In various embodiments, however, the process flow 200 may be performed by any number of entities.

The user 202 may include any entity seeking to deploy workloads in a distributed end-to-end (E2E) computing environment (e.g., an independent software vendor (ISV)).

The hardware provider 204 may include any vendor of computing hardware that could potentially be deployed and/or provisioned as part of the E2E computing infrastructure (e.g., Intel, AMD, ARM, NVIDIA, Qualcomm, Google). In some cases, the process flow 200 may involve multiple hardware providers 204 that each provide different hardware components.

The service provider 206 may include any entity that owns and/or operates some or all of the E2E computing infrastructure (e.g., a cloud service provider (CSP) such as Amazon, Google, or Microsoft). Moreover, the service provider 206 may also provide automated hardware recommendations and/or resource provisioning for workloads that are to be deployed on the E2E computing infrastructure. In the illustrated embodiment, for example, the service provider 206 is a third party that provides an end-to-end (E2E) hardware recommender service 208, which is used to provide double-blinded hardware recommendations for workloads of the user 202 that are to be deployed on the E2E computing infrastructure using computing hardware of the hardware provider(s) 204. In some cases, the service provider 206 may also perform automated resource provisioning for those workloads based on the hardware recommendations provided by the E2E hardware recommender 208.

While the E2E hardware recommender 208 is implemented by the service provider 206 in the illustrated embodiment, it should be appreciated that the E2E hardware recommender 208 is a "blackbox" hardware recommendation service that can be implemented by any entity in other embodiments, including an entity other than the user 202, hardware provider 204, or service provider 206.

In process flow 200, the E2E hardware recommender 208 provides double-blinded hardware recommendations for workloads of the user 202 that are to be deployed on the E2E computing infrastructure using computing hardware of the hardware provider(s) 204. In the illustrated example, the user 202 and the hardware provider 204 each provide certain confidential information to the E2E hardware recommender 208, but they both remain "blind" to each other's respective information. The data elements outlined in bold (e.g., blackbox hardware performance measures 214, hardware resource capacity 215, whitebox hardware performance measures 216) are examples of the type of confidential information that one entity (e.g., the user 202 or hardware provider 204) may intend to hide from the other during the hardware recommendation process. The steps of the process flow 200 are described further below.

In process flow 200, the hardware provider 204 uploads hardware performance information to the service provider 206 (a secure third-party intermediary), such as hardware resource capacity 215 and whitebox task performance measures 216 for various hardware components offered by the hardware provider 206. Alternatively, or additionally, a model profiler may be used to evaluate the performance of whitebox tasks on the respective hardware components (e.g., using OpenVINO's Model Profiler).

Separately, the user 202 submits a request to the service provider 206 to provide hardware recommendations and/or resource provisioning for a workload to be deployed in an end-to-end (E2E) computing environment. As part of this request, the user 202 provides the following information:
  (i) a workload of tasks and their dependencies 212, along with a list of whitebox tasks 213, and/or a list of blackbox tasks 214 with their performance measures on various hardware components that are available to the user 202;
  (ii) a network topology 210, along with a list of devices and potential hardware choices to be considered for each device 211 (e.g., an edge processing device implemented with a choice between an Intel Core i5 processor and an Intel Xeon E3 processor).

The service provider 206, upon receiving the request from the user 202, then uses the E2E hardware recommender 208 to provide double-blinded hardware recommendations for deploying the workload 212 based on the information provided by the user 202 and hardware provider 204.

First, the E2E hardware recommender 208 creates graphs representing the workload 220 and the network topology 217, as illustrated in FIGS. 3A-B, respectively. For example, FIG. 3A illustrates an example workload graph 310, where the vertices represent the tasks of the workload and the edges represent the dependencies among those tasks. In the illustrated example, the workload includes tasks to decode 311, detect 312, track 313, and then serialize 314. Similarly, FIG. 3B illustrates an example network topology graph 320, where the vertices represent nodes in the network and the edges represent connections among those nodes. In the illustrated example, the network topology includes a cloud node 321, which is connected to an edge node 322, which is then connected to four cameras 323, 324, 325, and 326.

Turning back to process flow 200, the E2E hardware recommender 208 then expands the workload 220 and network topology 217 graphs to reflect the respective hardware choices that are being considered. For example, the workload graph 220 is expanded 221 based on hardware choices for the whitebox and/or blackbox tasks in the workload, while the network topology graph 217 is expanded 218 based on hardware choices for the devices in the network topology, as illustrated in FIGS. 4A-B, respectively.

In particular, FIG. 4A illustrates an example of an expanded workload graph 410, which expands the workload graph 310 from FIG. 3A to include multiple hardware choices for various tasks. In the expanded workload graph 410, for example, the detect and track tasks are respectively expanded to include a choice between CPU and GPU implementations. For example, the expanded workload graph 410 includes tasks to decode 411, detect using either a CPU 412a or GPU 412b, track using either a CPU 413a or GPU 413b, and then serialize 414.

Similarly, FIG. 4B illustrates an example of an expanded network topology graph 420, which expands the network topology graph 320 of FIG. 3B to include multiple hardware choices for certain nodes. In the expanded network topology graph 420, for example, the edge node is expanded to include a choice between an Intel Core i5 processor and an Intel Xeon E3 processor. For example, the expanded network topology graph 420 includes a cloud node 421, which is connected to edge nodes 422a,b with Intel Core i5 and Xeon E3 processors, respectively, which are each connected to the four cameras 423, 424, 425, and 426.

Turning back to process flow 200, the E2E hardware recommender 208 then generates task dependency and device connectivity graphs 222, 219 from the expanded workload and network topology graphs 221, 218. In particular, the task dependency graph 222 and the device connectivity graph 219 are generated by incorporating weights onto the vertices and edges of the expanded workload graph 221 and the expanded network topology graph 218, respectively.

For example, the task dependency graph 222 is generated by incorporating weights onto the vertices and edges of the expanded workload graph 221 to represent resource requirements and network requirements, respectively. In some embodiments, for example, the weights on the vertices may represent processing resource requirements for the respective tasks, while the weights on the edges may represent network bandwidth requirements for the dependencies among the tasks. These weights may be derived at least in part from the performance measures provided by the user 202 and/or the hardware provider 204, such as the hardware performance measures for blackbox 214 and/or whitebox 216 tasks associated with the workload.

Similarly, the device connectivity graph 219 is generated by incorporating weights onto the vertices and edges of the expanded network topology graph 218 to represent resource capacities and network capacities, respectively. In some embodiments, for example, the weights on the vertices may represent processing resource capacities of the respective devices or nodes in the network topology, while the weights on the edges may represent network bandwidth capacities among the devices or nodes. These weights may be derived at least in part from the hardware resource capacity information 215 provided by the hardware provider 204.

The E2E hardware recommender 208 then uses the task dependency and device connectivity graphs 222, 219 to derive the optimal hardware for deploying the workload. In particular, since the task dependency and device connectivity graphs 222, 219 are both directed acyclic graphs (DAGs), DAG path selection and scheduling techniques can be leveraged to derive the optimal hardware choices from those graphs 222, 219. In process flow 200, for example, a path selection DAG-to-DAG scheduling algorithm 223 is used to derive the optimal hardware for the workload. The details of the scheduling algorithm 223 are addressed further below.

Figure 5A:
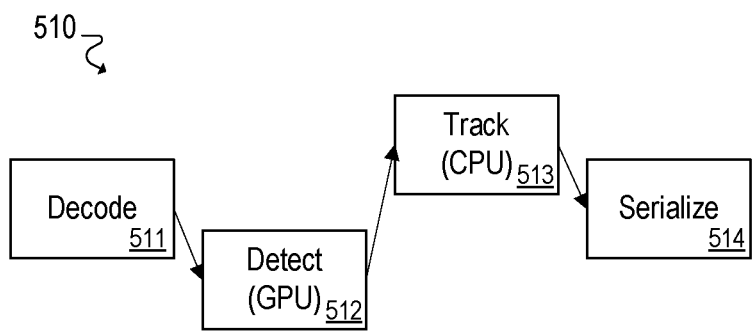
FIGS. 5A-B illustrate examples of workload and network topology graphs with optimal hardware selections.
Figure 5B:
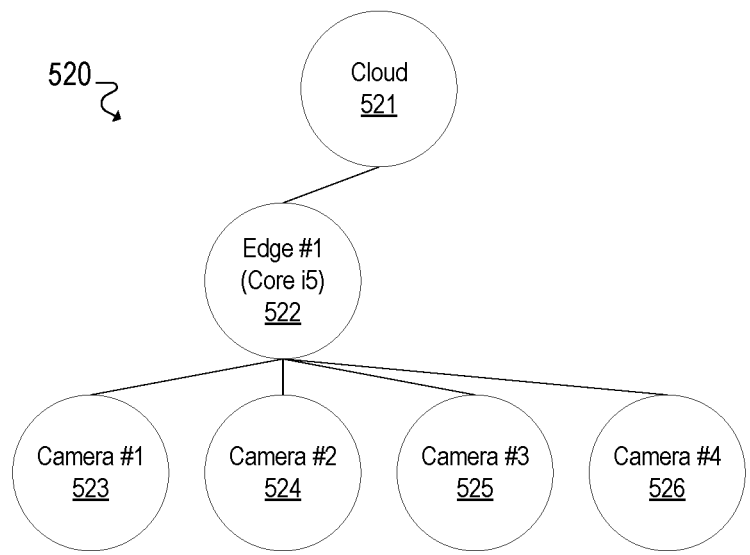

The scheduling algorithm 223 outputs an optimal schedule 224 for the workload, which includes a unique task path for the workload, and a path of recommended hardware for each source-sink pair (e.g., camera-cloud pair) in the network topology, as illustrated in FIGS. 5A-B, respectively.

For example, FIG. 5A illustrates a graph 510 of the unique task path chosen for the workload. In the illustrated example, the "detect" task is chosen to be performed on a GPU rather than a CPU, while the "track" task is chosen to be performed on a CPU rather than a GPU. Thus, the resulting task path graph 510 includes tasks to decode 511, detect (on a GPU) 512, track (on a CPU) 513, and then serialize 514.

Similarly, FIG. 5B illustrates a network topology graph 520 with a path through the recommended hardware for each source-sink pair (e.g., camera-cloud pair) in the network topology. In the network topology graph 520, for example, an Intel Core i5 processor is chosen over an Intel Xeon E3 processor for the edge node in the network topology. Thus, the resulting network topology graph 520 includes a cloud node 521, which is connected to an edge node 522 with an Intel Core i5 processor, which is then connected to the four cameras 523, 524, 525, and 526.

Turning back to process flow 200, based on the schedule 224 generated by the scheduling algorithm 223, the E2E hardware recommender 208 then extracts 225 a list of recommended hardware 226 from the network topology graph in the schedule 224. In the network topology graph of FIG. 5B, for example, the Intel Core i5 processor is recommended over the Intel Xeon E3 processor for the edge node.

The resulting hardware recommendations 226 are then used to automatically provision the appropriate resources 227 for deploying the workload on the network topology per the user's 202 requirements. The resource provisioning may involve the selection, deployment, configuration, and/or runtime management of the requisite resources for the workload, including hardware resources (e.g., CPUs, GPUs, accelerators, storage, network resources) and software resources (e.g., virtual machines (VM), applications, containers, tasks, database management systems (DBMS), load balancers). For example, if the recommended hardware is not already deployed in the service provider's 206 infrastructure, new hardware may be ordered from the hardware provider 204 and/or deployed by the service provider 206. If the recommended hardware is already deployed in the service provider's 206 infrastructure, the requisite hardware and software resources for deploying the workload may be provisioned on that hardware.

As noted above, the scheduling algorithm 223 uses path selection DAG-to-DAG scheduling to derive the optimal hardware recommendations for the workload. In some embodiments, for example, path selection DAG-to-DAG scheduling may be implemented using integer linear programming (ILP) techniques. For example, the workload scheduling problem can be reduced to the following ILP problem:

minimize: $c^T x$ (objective term)

subject to: $Ax \leq b$ (inequality constraint)

$Cx = d$ (equality constraint)

and: $x \in \{0,1\}^K$ (binary constraint).

This ILP model can be used to determine an optimal schedule that satisfies a specified objective (e.g., minimizing bandwidth utilization, minimizing hardware costs, maximizing performance), while also adhering to various constraints (e.g., workload resource requirements, device and network resource capacities, mapping constraints). For example, in this ILP model, x represents the collection of possible schedules (e.g., paths in the graphs), K is the length of x, the objective term represents the scheduling objective to be minimized, and the inequality/equality constraints represent the additional constraints on the scheduling objective.

Note that, in this case, the scheduling problem is a path selection problem rather than a conventional task placement problem. In this formulation of ILP scheduling, x can be represented as:

$$x = \{x_{d,e}^{j}\}_{j=1}^{J}$$

where e is an edge in the task dependency graph, d is an edge in the device connectivity graph, and j is the $j^{th}$ job (or workload) of the task dependency graph. The interpretation of each $x_{d,e}$ is that edge e's prior task is the last being run on one of edge d's prior devices.

An instance of this ILP scheduling problem also requires: (1) resource requirements of tasks and their dependencies; (2) resource capacities of devices and their connectivity; (3) a task-device source mapping (e.g., a user-specific data acquisition point such as a sensor or camera); and (4) a task-device sink mapping (e.g., a data consumption point such as a cloud server).

The scheduling problem can then be defined by using ILP to optimize a desired scheduling or deployment objective while adhering to certain constraints. For example, the objective of the optimization problem can be defined arbitrarily depending on the needs of a particular user, such as minimizing total bandwidth utilization, minimizing hardware resource utilization, minimizing hardware costs, minimizing workload latency, maximizing performance, and so forth. The chosen objective is then optimized subject to the following constraints:

(1) Single source constraint: selecting only one path per job j implies that only one source task per job j can be selected;

(2) Sink constraint: a job must be done implies only one sink task per job j can be selected;

(3) Source-sink constraint: a job must be done implies that a task being selected implies its succeeding task is selected;

(4) Ordering constraint: a task can only be run on one device;

(5) Single choice constraint: only one hardware option can be selected;

(6) Device resource constraint: the total resources consumed on a device cannot exceed the device's resource capacity; and (7) Network resource constraint: the total network resources consumed over a connectivity link between devices cannot exceed that link's network resource capacity.

Since the objective and constraints identified above are all linear, this optimization problem can be solved using integer linear programming (ILP).

The input to the scheduling algorithm includes a collection of enumerations of all paths from the source task to the sink task (e.g., in the task dependency graph) and all paths from all source devices to all sink devices (e.g., in the device connectivity graph), and their correspondences for each workload. The output is a collection of path-to-path mappings representing selections of workload task resources and device hardware.

As an example, the collection of enumerations provided as input to the scheduling algorithm for the task dependency and device connectivity graphs from FIGS. 4A-B are provided below in TABLE 1.

TABLE 1

ILP enumerations for the example graphs of FIGS. 4A-B

| j | TASK PATH ENUMERATIONS | | DEVICE PATH ENUMERATIONS |
|---|---|---|---|
| 1 | Decode-DetectCPU-TrackCPU-Serialize<br>Decode-DetectCPU-TrackGPU-Serialize<br>Decode-DetectGPU-TrackCPU-Serialize<br>Decode-DetectGPU-TrackGPU-Serialize | <-> | Camera#1-Edge#1Corei5-Cloud<br>Camera#1-Edge#1XeonE3-Cloud |
| 2 | Decode-DetectCPU-TrackCPU-Serialize<br>Decode-DetectCPU-TrackGPU-Serialize<br>Decode-DetectGPU-TrackCPU-Serialize<br>Decode-DetectGPU-TrackGPU-Serialize | <-> | Camera#2-Edge#1Corei5-Cloud<br>Camera#2-Edge#1XeonE3-Cloud |
| 3 | Decode-DetectCPU-TrackCPU-Serialize<br>Decode-DetectCPU-TrackGPU-Serialize<br>Decode-DetectGPU-TrackCPU-Serialize<br>Decode-DetectGPU-TrackGPU-Serialize | <-> | Camera#3-Edge#1Corei5-Cloud<br>Camera#3-Edge#1XeonE3-Cloud |
| 4 | Decode-DetectCPU-TrackCPU-Serialize<br>Decode-DetectCPU-TrackGPU-Serialize<br>Decode-DetectGPU-TrackCPU-Serialize<br>Decode-DetectGPU-TrackGPU-Serialize | <-> | Camera#4-Edge#1Corei5-Cloud<br>Camera#4-Edge#1XeonE3-Cloud |

For simplicity, the examples presented in FIGS. 3A-B, 4A-B, and 5A-B assume that identical workloads are deployed to all source-sink pairs in a network topology with a tree structure. In general, however, the described solution also applies to heterogeneous workloads and network topologies having any type of graph structure or shape.

Figure 6:
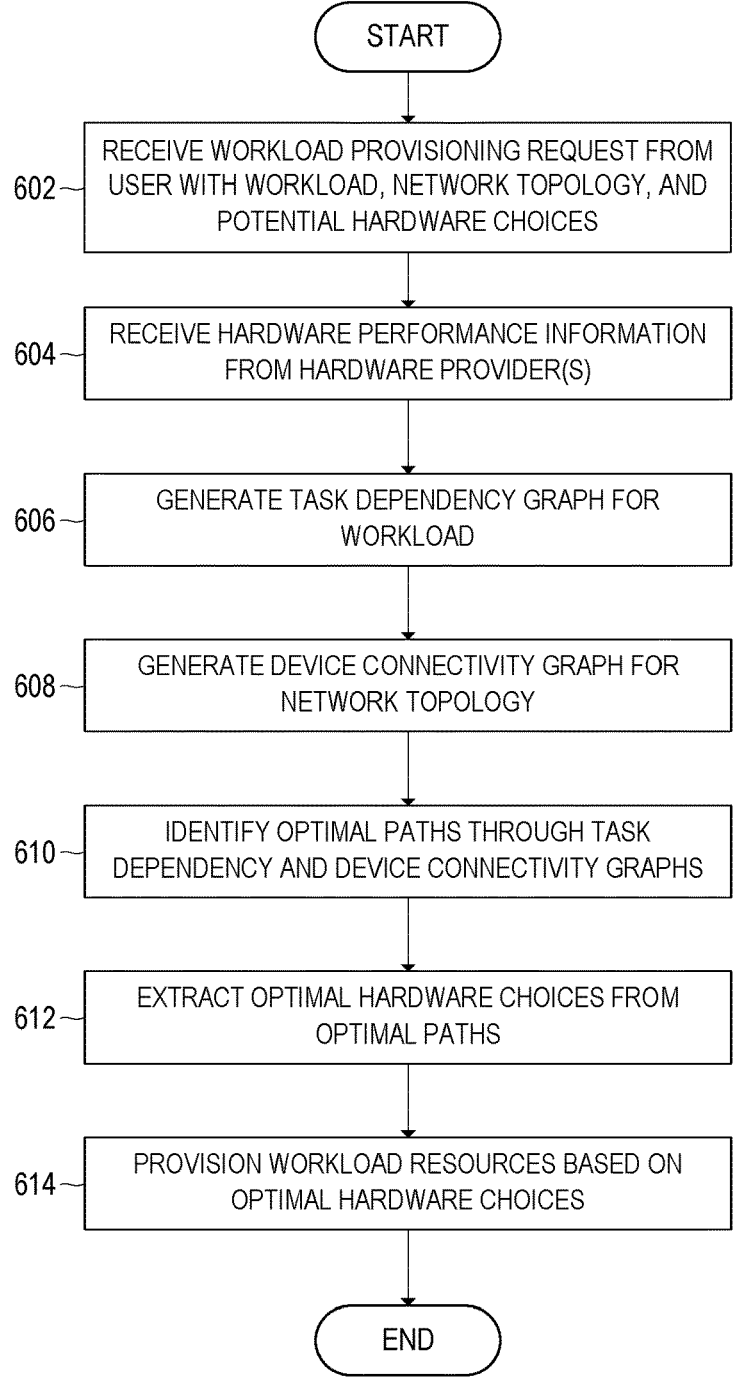
FIG. 6 illustrates a flowchart for an example embodiment of automated resource provisioning using double-blinded hardware recommendations.

FIG. 6 illustrates a flowchart 600 for an example embodiment of automated resource provisioning using double-blinded hardware recommendations. In some cases, flowchart 600 may be implemented using the embodiments and functionality described throughout this disclosure. For example, flowchart 600 may be implemented by one or more computing devices, platforms, or systems that are used for provisioning resources and/or deploying workloads across computing environments with heterogeneous computing resources. In some embodiments, for example, a computing device used for workload orchestration, provisioning, and/or deployment may include: (i) a communication interface to communication with a user, one or more hardware providers, and a collection of heterogeneous computing resources in a computing environment; and (ii) one or more processors to perform automated resource provisioning using double-blinded hardware recommendations.

The flowchart begins at block 602, where a workload provisioning request is received from a user. The workload provisioning request includes information associated with a workload, a network topology, and a plurality of potential hardware choices for deploying the workload over the network topology.

The workload includes a collection of tasks and various dependencies among those tasks. In general, a "workload" may refer to any particular type and/or amount of work to be performed by computing resources, while "tasks" may refer to discrete functions or sub-units of the workload that are each devoted to performing a particular computing task. In various embodiments, the workload and its tasks can be embodied as any collection of software, code, virtual machines, applications, containers, microservices, and so forth. For example, in some embodiments, a workload may include a collection of containers that are each designed to implement a particular task for the workload.

The user may also provide a list of task implementations for the workload. In some embodiments, for example, an individual "task" of the workload may be implemented and/or optimized for various different types of hardware, such as CPUs, GPUs, FPGAs, ASICs, and so forth. These task implementations can be whitebox tasks (e.g., public or open task implementations) or blackbox tasks (e.g., proprietary or closed task implementations). In some embodiments, the user may provide a list of whitebox and/or blackbox tasks for the workload. The user may also provide performance measures for certain task implementations (e.g., performance measures of blackbox tasks on different types of hardware).

The network topology identifies the topology of a computing environment that the workload is to be deployed in. In particular, the network topology includes a collection of nodes and various connections among those nodes (e.g., sensors/edge nodes, fog nodes, cloud nodes, and corresponding connections).

The potential hardware choices include a variety of potential hardware devices for implementing the nodes in the network topology, and a variety of potential hardware implementations of the tasks associated with the workload.

The flowchart then proceeds to block 604, where hardware performance information for the potential hardware choices is received from one or more hardware provider(s). The hardware provider(s), for example, may be the designers, manufactures, and/or suppliers of the hardware devices identified in the user's list of potential hardware choices. Moreover, the hardware performance information may include resource capacity information for those hardware devices. The hardware performance information may also include performance measures for certain tasks of the workload on various hardware (e.g., performance measures of whitebox tasks on different types of hardware).

The flowchart then proceeds to block 606 to generate a task dependency graph for the workload. The task dependency graph is a graph that represents the tasks associated with the workload, the dependencies among those tasks, the potential hardware implementations of those tasks, and various workload resource requirements.

In some embodiments, for example, the task dependency graph is generated by first creating a graph of the tasks and dependencies of the workload, where the tasks are represented as vertices in the graph and the dependencies are represented as edges in the graph. The graph is then expanded based on the potential hardware implementations of those tasks/vertices. For example, the tasks/vertices are expanded or duplicated to represent the potential hardware implementations of each task, and the dependencies/edges are similarly expanded to represent the corresponding dependencies. Finally, weights are inserted on the task/vertices and the dependencies/edges to represent the workload resource requirements.

The flowchart then proceeds to block 608 to generate a device connectivity graph for the network topology. The device connectivity graph is a graph that represents the nodes in the network topology, the connections among the nodes, the potential hardware devices for implementing the nodes, and the resource capacities (e.g., the resource capacity of each device and connection in the graph).

In some embodiments, for example, the device connectivity graph is generated by first creating a graph of the nodes and connections in the network topology, where the nodes are represented as vertices in the graph and the connections are represented as edges in the graph. The graph is then expanded based on the potential hardware devices for implementing the nodes/vertices. For example, the nodes/vertices are expanded or duplicated to represent the potential hardware devices for each node, and the connections/edges are similarly expanded to represent the corresponding connections. Finally, weights are inserted on the nodes/vertices and the connections/edges to represent the resource capacities.

The flowchart then proceeds to block 610 to identify optimal paths through the task dependency and device connectivity graphs. In some embodiments, for example, the optimal paths through the graphs are identified as the paths that optimize a particular deployment objective while adhering to various deployment constraints.

For example, a deployment objective for the workload is first identified or defined, such as minimizing network resource utilization, minimizing hardware resource utilization, minimizing hardware costs, or minimizing workload latency, among other examples.

Various deployment constraints for the workload are also identified or defined. For example, these deployment constraints may be at least partially derived from the task dependency and device connectivity graphs (e.g., based on the resource requirements and resource capacities), and may also include various other constraints (e.g., mapping constraints), as described further throughout this disclosure.

The deployment objective and deployment constraints are then used to identify the optimal hardware choices for the workload (e.g., the hardware choices that optimize the deployment objective while adhering to the deployment constraints). In particular, optimal paths are identified through the task dependency and device connectivity graphs that optimize the deployment objective while adhering to the deployment constraints.

In some embodiments, for example, the task dependency and device connectivity graphs are represented as directed acyclic graphs (DAGs). Moreover, directed acyclic graph to directed acyclic graph (DAG-to-DAG) scheduling is then performed to identify and/or select the optimal paths through those graphs.

In some embodiments, integer linear programming (ILP) may be leveraged to perform the scheduling. For example, an integer linear programming (ILP) model designed to optimize the deployment objective while adhering to the deployment constraints may be solved in order to identify the optimal paths through the graphs. This ILP model is supplied with all possible paths through the task dependency and device connectivity graphs as input, and the ILP model evaluates the possible paths and selects the optimal paths that optimize the deployment objective while satisfying the deployment constraints.

The flowchart then proceeds to block 612 to extract the optimal hardware choices from the optimal paths identified through the task dependency and device connectivity graphs. For example, the optimal path through the device connectivity graph contains the optimal hardware devices to use for implementing the nodes in the network topology. Similarly, the optimal path through the task dependency graph contains the optimal hardware implementations of the tasks of the workload.

The flowchart then proceeds to block 614 to provision resources for deploying the workload over the network topology based on the optimal hardware choices, as described further throughout this disclosure.

At this point, the flowchart may be complete. In some embodiments, however, the flowchart may restart and/or certain blocks may be repeated. For example, in some embodiments, the flowchart may restart at block 602 to continue receiving and processing workload provisioning requests.

Example Internet-of-Things (IoT) Implementations

FIGS. 7-10 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 7:
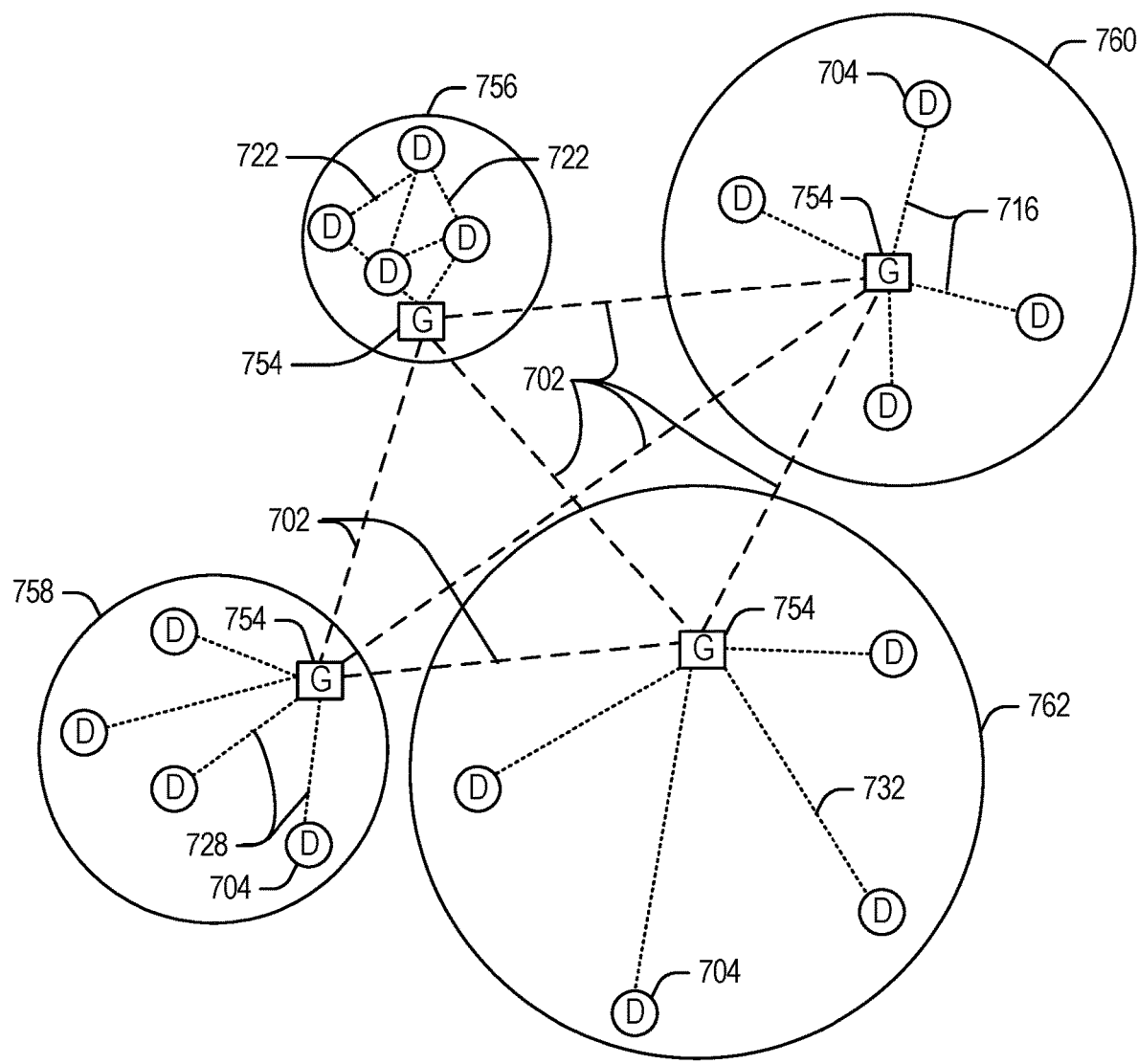
FIGS. 7, 8, 9, and 10 illustrate examples of Internet-of-Things (IoT) networks and architectures that can be used in accordance with certain embodiments.

FIG. 7 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7-10, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 8 below.

Figure 8:
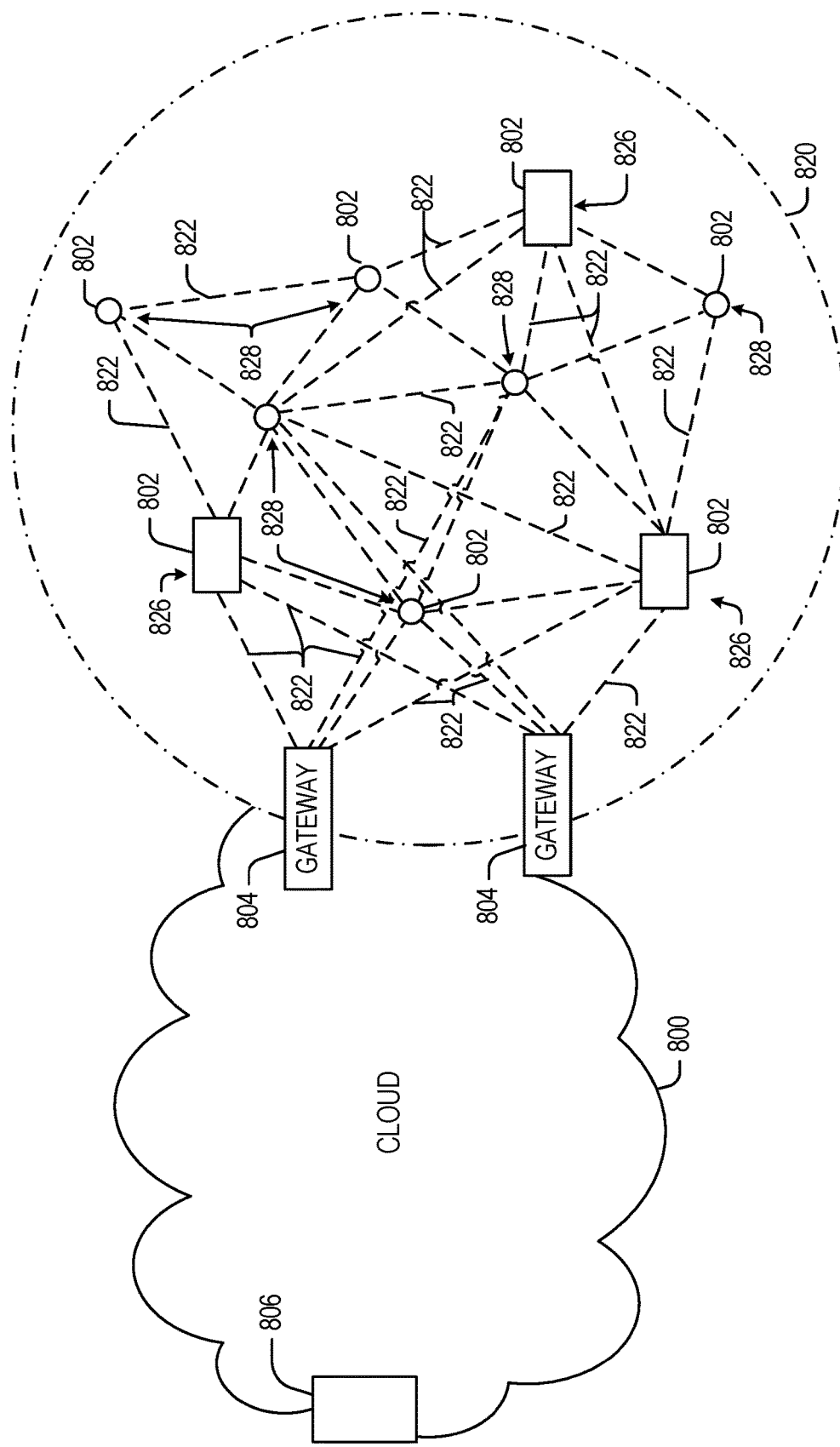

FIG. 8 illustrates a cloud computing network in communication with a mesh network of IoT devices (devices 802) operating as a fog device at the edge of the cloud computing network. The mesh network of IoT devices may be termed a fog 820, operating at the edge of the cloud 800. To simplify the diagram, not every IoT device 802 is labeled.

The fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the fog 820, and may also provide the backend process function for data obtained from sensors 828, such as motion data, flow data, temperature data, and the like. The data aggregators 826 may collect data from any number of the sensors 828, and perform the back-end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along a convenient path (e.g., a most convenient path) between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The fog 820 provided from these IoT devices 802 may be presented to devices in the cloud 800, such as a server 806, as a single device located at the edge of the cloud 800, e.g., a fog device. In this example, the alerts coming from the fog device may be sent without being identified as coming from a specific IoT device 802 within the fog 820. In this fashion, the fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the fog device may be configured in a declarative programming style, allowing the IoT devices 802 to reconfigure their operations and communications, such as to determine needed resources in response to conditions, queries, and device failures. As an example, a query from a user located at a server 806 about the operations of a subset of equipment monitored by the IoT devices 802 may result in the fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, IoT devices 802 in the fog 820 may select the sensors 828 used based on the query, such as adding data from flow sensors or temperature sensors. Further, if some of the IoT devices 802 are not operational, other IoT devices 802 in the fog 820 device may provide analogous data, if available.

Figure 9:
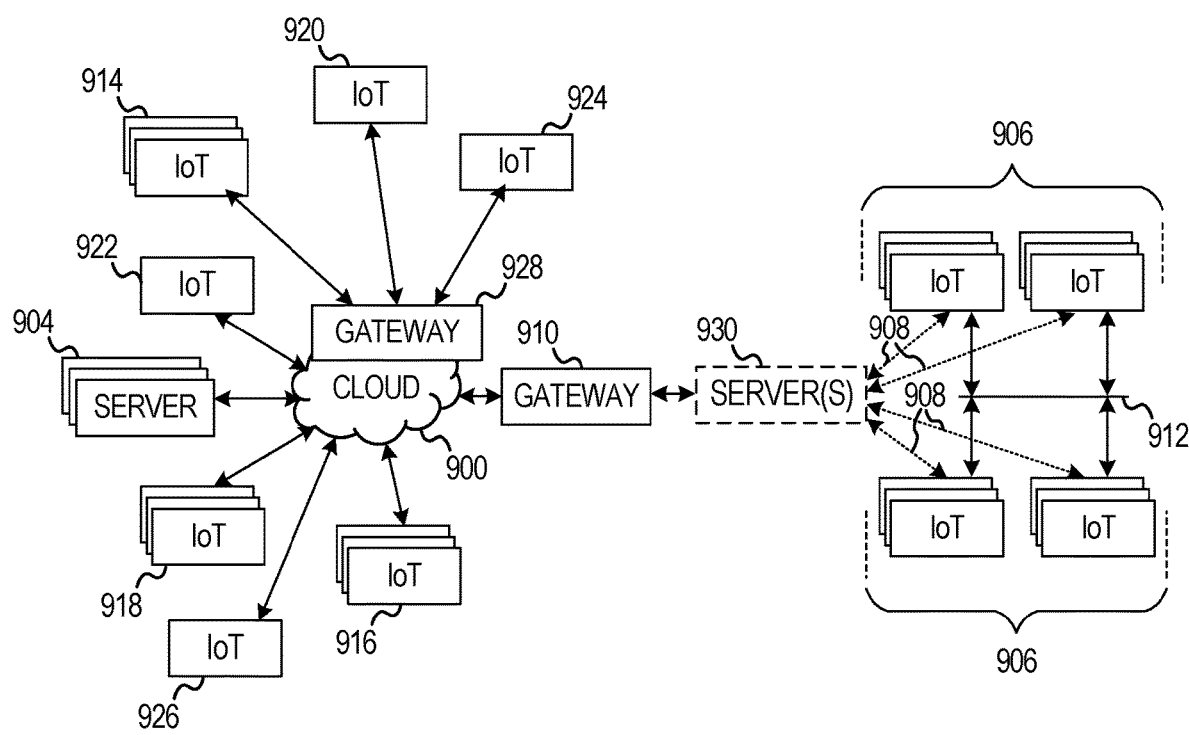

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 8), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8).

Figure 10:
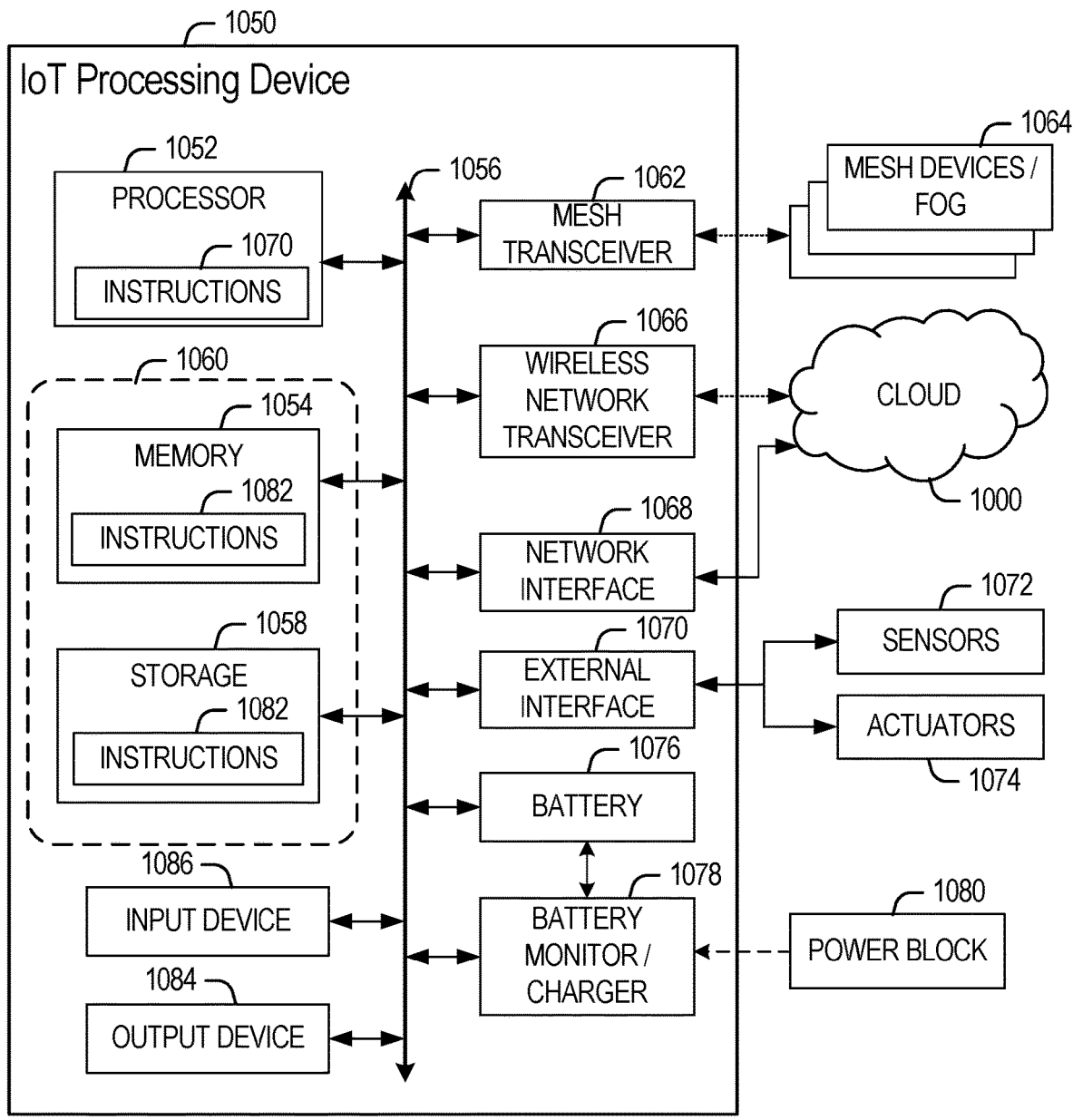

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2790 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may include storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and diagram(s) of operations and functionality described throughout this disclosure.

Example Computing Architectures

Figure 11:
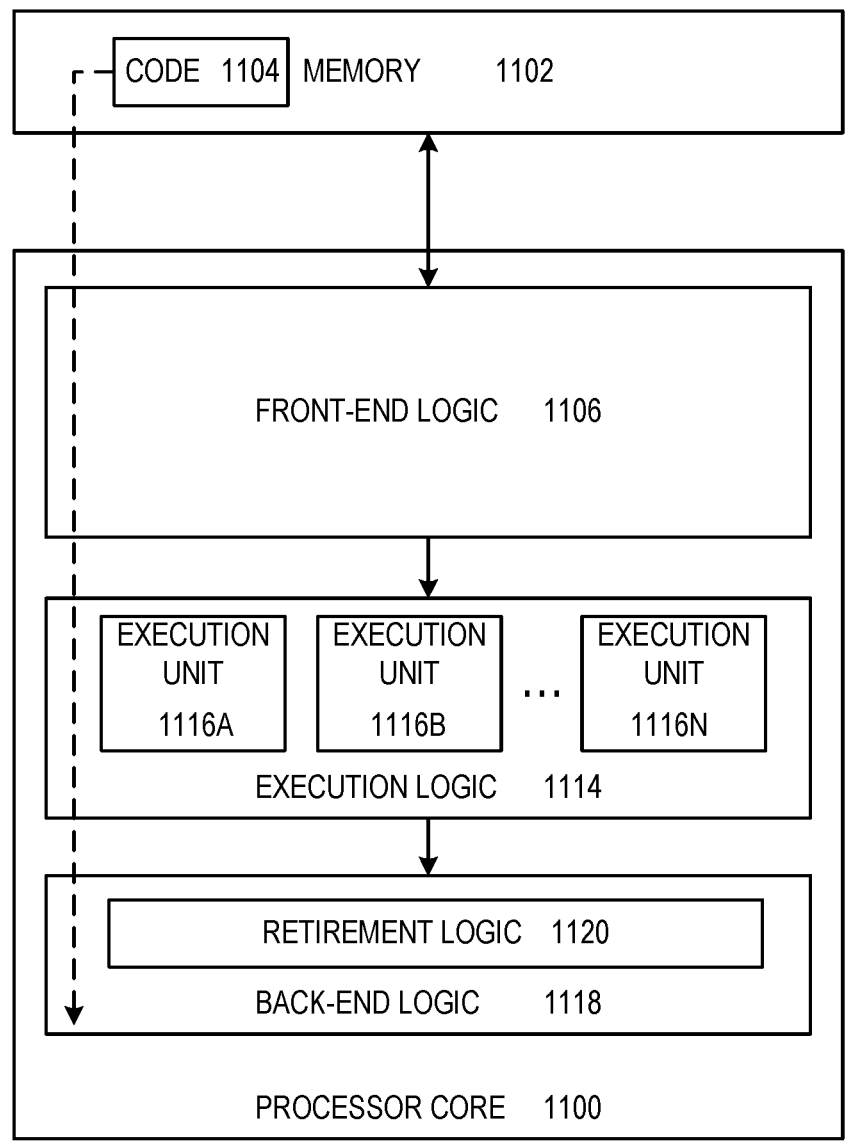
FIGS. 11 and 12 illustrate example computer architectures that can be used in accordance with certain embodiments.
Figure 12:
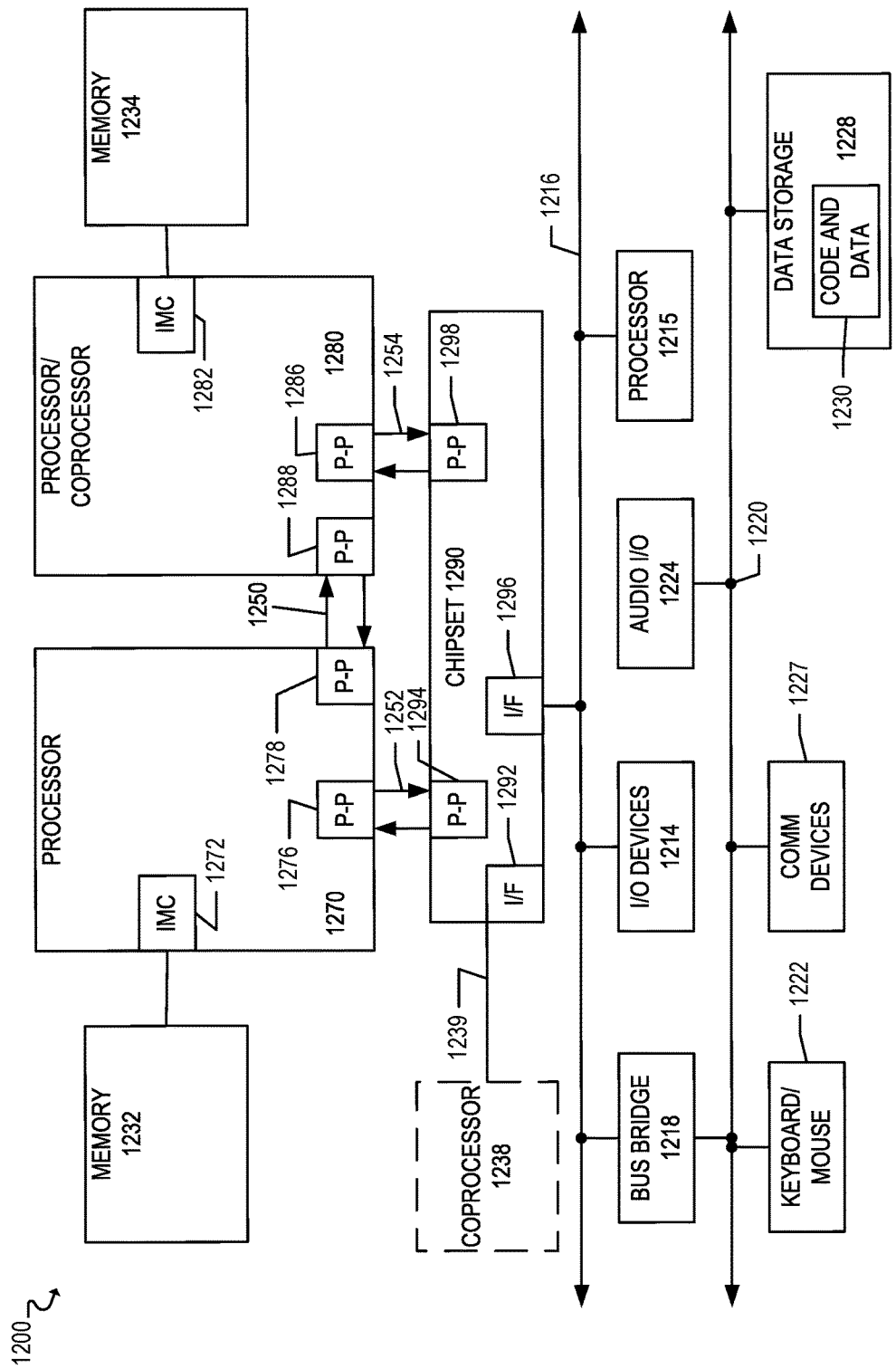

FIGS. 11 and 12 illustrate example computer processor architectures that can be used in accordance with embodiments disclosed herein. For example, in various embodiments, the computer architectures of FIGS. 11 and 12 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 11 illustrates a block diagram for an example embodiment of a processor 1100. Processor 1100 is an example of a type of hardware device that can be used in connection with the embodiments described throughout this disclosure. Processor 1100 may be any type of processor, such as a microprocessor, an embedded processor, a digital signal processor (DSP), a network processor, a multi-core processor, a single core processor, or other device to execute code. Although only one processor 1100 is illustrated in FIG. 11, a processing element may alternatively include more than one of processor 1100 illustrated in FIG. 11. Processor 1100 may be a single-threaded core or, for at least one embodiment, the processor 1100 may be multi-threaded in that it may include more than one hardware thread context (or "logical processor") per core.

FIG. 11 also illustrates a memory 1102 coupled to processor 1100 in accordance with an embodiment. Memory 1102 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1100 can execute any type of instructions associated with algorithms, processes, or operations detailed herein. Generally, processor 1100 can transform an element or an article (e.g., data) from one state or thing to another state or thing.

Code 1104, which may be one or more instructions to be executed by processor 1100, may be stored in memory 1102, or may be stored in software, hardware, firmware, or any suitable combination thereof, or in any other internal or external component, device, element, or object where appropriate and based on particular needs. In one example, processor 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 may also include register renaming logic and scheduling logic, which generally allocate resources and queue the operation corresponding to the instruction for execution.

Processor 1100 can also include execution logic 1114 having a set of execution units 1116a, 1116b, 1116n, etc. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor 1100 allows out of order execution but requires in order retirement of instructions. Retirement logic 1120 may take a variety of known forms (e.g., re-order buffers or the like). In this manner, processor 1100 is transformed during execution of code 1104, at least in terms of the output generated by the decoder, hardware registers and tables utilized by register renaming logic 1110, and any registers (not shown) modified by execution logic 1114.

Although not shown in FIG. 11, a processing element may include other elements on a chip with processor 1100. For example, a processing element may include memory control logic along with processor 1100. The processing element may include I/O control logic and/or may include I/O control logic integrated with memory control logic. The processing element may also include one or more caches. In some embodiments, non-volatile memory (such as flash memory or fuses) may also be included on the chip with processor 1100.

FIG. 12 illustrates a block diagram for an example embodiment of a multiprocessor 1200. As shown in FIG. 12, multiprocessor system 1200 is a point-to-point interconnect system, and includes a first processor 1270 and a second processor 1280 coupled via a point-to-point interconnect 1250. In some embodiments, each of processors 1270 and 1280 may be some version of processor 1100 of FIG. 11.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of this disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

All or part of any component of FIG. 12 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The machine-readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's° industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a communication interface to communicate over a network with a user and one or more hardware providers; and a processor to: receive, via the communication interface, a workload provisioning request from the user, wherein the workload provisioning request comprises information associated with a workload, a network topology, and a plurality of potential hardware choices for deploying the workload over the network topology; receive, via the communication interface, hardware performance information associated with the plurality of potential hardware choices, wherein the hardware performance information is received from the one or more hardware providers; generate a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements; generate a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities; select, based on the task dependency graph and the device connectivity graph, one or more hardware choices from the plurality of potential hardware choices; and provision a plurality of resources for deploying the workload over the network topology, wherein the plurality of resources are provisioned based on the one or more hardware choices.

In one example embodiment of an apparatus, the processor to generate the task dependency graph associated with the workload is further to: generate the task dependency graph to represent the plurality of tasks associated with the workload and the plurality of dependencies among the plurality of tasks, wherein the plurality of tasks are represented as graph vertices and the plurality of dependencies are represented as graph edges; expand the task dependency graph to represent the plurality of potential hardware implementations of the plurality of tasks, wherein the graph vertices corresponding to the plurality of tasks are expanded to represent the plurality of potential hardware implementations; and insert weights onto the graph vertices and the graph edges to represent the plurality of resource requirements.

In one example embodiment of an apparatus, the processor to generate the device connectivity graph associated with the network topology is further to: generate the device connectivity graph to represent the plurality of nodes in the network topology and the plurality of connections among the plurality of nodes, wherein the plurality of nodes are represented as graph vertices and the plurality of connections are represented as graph edges; expand the device connectivity graph to represent the plurality of potential hardware devices for implementing the plurality of nodes, wherein the graph vertices corresponding to the plurality of nodes are expanded to represent the plurality of potential hardware devices; and insert weights onto the graph vertices and the graph edges to represent the plurality of resource capacities.

In one example embodiment of an apparatus, the plurality of potential hardware choices comprise: the plurality of potential hardware implementations of the plurality of tasks; and the plurality of potential hardware devices for implementing the plurality of nodes.

In one example embodiment of an apparatus, the processor to select, based on the task dependency graph and the device connectivity graph, the one or more hardware choices from the plurality of potential hardware choices is further to: select one or more hardware implementations of the plurality of tasks, wherein the one or more hardware implementations are selected from the plurality of potential hardware implementations; and select one or more hardware devices for implementing the plurality of nodes, wherein the one or more hardware devices are selected from the plurality of potential hardware devices.

In one example embodiment of an apparatus, the processor to select, based on the task dependency graph and the device connectivity graph, the one or more hardware choices from the plurality of potential hardware choices is further to: identify a deployment objective for the workload; identify a plurality of deployment constraints for the workload, wherein the plurality of deployment constraints are identified based at least partially on the task dependency graph and the device connectivity graph; and identify the one or more hardware choices that optimize the deployment objective and satisfy the plurality of deployment constraints, wherein the one or more hardware choices are identified from the plurality of potential hardware choices based on the task dependency graph and the device connectivity graph.

In one example embodiment of an apparatus, the deployment objective comprises: minimizing network resource utilization; minimizing hardware resource utilization; minimizing hardware costs; or minimizing workload latency.

In one example embodiment of an apparatus, the processor to identify the one or more hardware choices that optimize the deployment objective and satisfy the plurality of deployment constraints is further to: identify optimal paths through the task dependency graph and the device connectivity graph, wherein the optimal paths are identified to optimize the deployment objective and satisfy the plurality of deployment constraints; and extract the one or more hardware choices corresponding to the optimal paths through the task dependency graph and the device connectivity graph.

In one example embodiment of an apparatus, the processor to identify the optimal paths through the task dependency graph and the device connectivity graph is further to: perform directed acyclic graph to directed acyclic graph (DAG-to-DAG) scheduling to select the optimal paths through the task dependency graph and the device connectivity graph, wherein the task dependency graph and the device connectivity graph are each represented as a directed acyclic graph (DAG).

In one example embodiment of an apparatus, the processor to identify the optimal paths through the task dependency graph and the device connectivity graph is further to: solve an integer linear programming (ILP) model to optimize the deployment objective based on the plurality of deployment constraints, wherein: the plurality of deployment constraints are based at least partially on the plurality of resource requirements from the task dependency graph and the plurality of resource capacities from the device connectivity graph; the ILP model is supplied with a plurality of possible paths through the task dependency graph and the device connectivity graph as input; and the ILP model evaluates the plurality of possible paths to identify the optimal paths that optimize the deployment objective and satisfy the plurality of deployment constraints.

One or more embodiments may include a system, comprising: a plurality of heterogeneous computing resources associated with a computing environment; a communication interface to communicate over a network with a user and one or more hardware providers; and a processor to: receive, via the communication interface, a workload provisioning request from the user, wherein the workload provisioning request comprises information associated with a workload, a network topology, and a plurality of potential hardware choices for deploying the workload over the network topology; receive, via the communication interface, hardware performance information associated with the plurality of potential hardware choices, wherein the hardware performance information is received from the one or more hardware providers; generate a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements; generate a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities; select, based on the task dependency graph and the device connectivity graph, one or more hardware choices from the plurality of potential hardware choices; and provision a plurality of resources for deploying the workload over the network topology, wherein the plurality of resources are provisioned on the plurality of heterogeneous computing resources based on the one or more hardware choices.

In one example embodiment of a system: the processor to generate the task dependency graph associated with the workload is further to: generate the task dependency graph to represent the plurality of tasks associated with the workload and the plurality of dependencies among the plurality of tasks, wherein the plurality of tasks are represented as task vertices in the task dependency graph, and wherein and the plurality of dependencies are represented as dependency edges in the task dependency graph; expand the task dependency graph to represent the plurality of potential hardware implementations of the plurality of tasks, wherein the task vertices are expanded to represent the plurality of potential hardware implementations; and insert weights onto the task vertices and the dependency edges to represent the plurality of resource requirements; and the processor to generate the device connectivity graph associated with the network topology is further to: generate the device connectivity graph to represent the plurality of nodes in the network topology and the plurality of connections among the plurality of nodes, wherein the plurality of nodes are represented as node vertices in the device connectivity graph, and wherein the plurality of connections are represented as connection edges in the device connectivity graph; expand the device connectivity graph to represent the plurality of potential hardware devices for implementing the plurality of nodes, wherein the node vertices are expanded to represent the plurality of potential hardware devices; and insert weights onto the node vertices and the connection edges to represent the plurality of resource capacities.

In one example embodiment of a system, the processor to select, based on the task dependency graph and the device connectivity graph, the one or more hardware choices from the plurality of potential hardware choices is further to: identify a deployment objective for the workload, wherein the deployment objective comprises minimizing network resource utilization, minimizing hardware resource utilization, minimizing hardware costs, or minimizing workload latency; identify a plurality of deployment constraints for the workload, wherein the plurality of deployment constraints are identified based at least partially on the task dependency graph and the device connectivity graph; and identify the one or more hardware choices that optimize the deployment objective and satisfy the plurality of deployment constraints, wherein the one or more hardware choices are identified from the plurality of potential hardware choices based on the task dependency graph and the device connectivity graph.

In one example embodiment of a system, the processor to identify the one or more hardware choices that optimize the deployment objective and satisfy the plurality of deployment constraints is further to: identify optimal paths through the task dependency graph and the device connectivity graph, wherein the optimal paths are identified to optimize the deployment objective and satisfy the plurality of deployment constraints; and extract the one or more hardware choices corresponding to the optimal paths through the task dependency graph and the device connectivity graph.

In one example embodiment of a system, the processor to identify the optimal paths through the task dependency graph and the device connectivity graph is further to: perform directed acyclic graph to directed acyclic graph (DAG-to-DAG) scheduling to select the optimal paths through the task dependency graph and the device connectivity graph, wherein the task dependency graph and the device connectivity graph are each represented as a directed acyclic graph (DAG).

In one example embodiment of a system, the processor to identify the optimal paths through the task dependency graph and the device connectivity graph is further to: solve an integer linear programming (ILP) model to optimize the deployment objective based on the plurality of deployment constraints, wherein: the plurality of deployment constraints are based at least partially on the plurality of resource requirements from the task dependency graph and the plurality of resource capacities from the device connectivity graph; the ILP model is supplied with a plurality of possible paths through the task dependency graph and the device connectivity graph as input; and the ILP model evaluates the plurality of possible paths to identify the optimal paths that optimize the deployment objective and satisfy the plurality of deployment constraints.

One or more embodiments may include at least one machine accessible storage medium having instructions stored thereon, wherein the instructions, when executed on a machine, cause the machine to: receive, via a communication interface, a workload provisioning request from a user, wherein the workload provisioning request comprises information associated with a workload, a network topology, and a plurality of potential hardware choices for deploying the workload over the network topology; receive, via the communication interface, hardware performance information associated with the plurality of potential hardware choices, wherein the hardware performance information is received from one or more hardware providers; generate a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements; generate a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities; select, based on the task dependency graph and the device connectivity graph, one or more hardware choices from the plurality of potential hardware choices; and provision a plurality of resources for deploying the workload over the network topology, wherein the plurality of resources are provisioned based on the one or more hardware choices.

In one example embodiment of a storage medium: the instructions that cause the machine to generate the task dependency graph associated with the workload further cause the machine to: generate the task dependency graph to represent the plurality of tasks associated with the workload and the plurality of dependencies among the plurality of tasks, wherein the plurality of tasks are represented as task vertices in the task dependency graph, and wherein and the plurality of dependencies are represented as dependency edges in the task dependency graph; expand the task dependency graph to represent the plurality of potential hardware implementations of the plurality of tasks, wherein the task vertices are expanded to represent the plurality of potential hardware implementations; and insert weights onto the task vertices and the dependency edges to represent the plurality of resource requirements; and the instructions that cause the machine to generate the device connectivity graph associated with the network topology further cause the machine to: generate the device connectivity graph to represent the plurality of nodes in the network topology and the plurality of connections among the plurality of nodes, wherein the plurality of nodes are represented as node vertices in the device connectivity graph, and wherein the plurality of connections are represented as connection edges in the device connectivity graph; expand the device connectivity graph to represent the plurality of potential hardware devices for implementing the plurality of nodes, wherein the node vertices are expanded to represent the plurality of potential hardware devices; and insert weights onto the node vertices and the connection edges to represent the plurality of resource capacities.

In one example embodiment of a storage medium, the instructions that cause the machine to select, based on the task dependency graph and the device connectivity graph, the one or more hardware choices from the plurality of potential hardware choices further cause the machine to: identify a deployment objective for the workload, wherein the deployment objective comprises minimizing network resource utilization, minimizing hardware resource utilization, minimizing hardware costs, or minimizing workload latency; identify a plurality of deployment constraints for the workload, wherein the plurality of deployment constraints are identified based at least partially on the task dependency graph and the device connectivity graph; identify optimal paths through the task dependency graph and the device connectivity graph, wherein the optimal paths are identified to optimize the deployment objective and satisfy the plurality of deployment constraints; and extract the one or more hardware choices corresponding to the optimal paths through the task dependency graph and the device connectivity graph.

In one example embodiment of a storage medium, the instructions that cause the machine to identify the optimal paths through the task dependency graph and the device connectivity graph further cause the machine to: perform directed acyclic graph to directed acyclic graph (DAG-to-DAG) scheduling to select the optimal paths through the task dependency graph and the device connectivity graph, wherein the task dependency graph and the device connectivity graph are each represented as a directed acyclic graph (DAG).

In one example embodiment of a storage medium, the instructions that cause the machine to identify the optimal paths through the task dependency graph and the device connectivity graph further cause the machine to: solve an integer linear programming (ILP) model to optimize the deployment objective based on the plurality of deployment constraints, wherein: the plurality of deployment constraints are based at least partially on the plurality of resource requirements from the task dependency graph and the plurality of resource capacities from the device connectivity graph; the ILP model is supplied with a plurality of possible paths through the task dependency graph and the device connectivity graph as input; and the ILP model evaluates the plurality of possible paths to identify the optimal paths that optimize the deployment objective and satisfy the plurality of deployment constraints.

One or more embodiments may include a method, comprising: receiving, via a communication interface, a workload provisioning request from a user, wherein the workload provisioning request comprises information associated with a workload, a network topology, and a plurality of potential hardware choices for deploying the workload over the network topology; receiving, via the communication interface, hardware performance information associated with the plurality of potential hardware choices, wherein the hardware performance information is received from one or more hardware providers; generating a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements; generating a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities; selecting, based on the task dependency graph and the device connectivity graph, one or more hardware choices from the plurality of potential hardware choices; and provisioning a plurality of resources for deploying the workload over the network topology, wherein the plurality of resources are provisioned based on the one or more hardware choices.

In one example embodiment of a method: generating the task dependency graph associated with the workload comprises: generating the task dependency graph to represent the plurality of tasks associated with the workload and the plurality of dependencies among the plurality of tasks, wherein the plurality of tasks are represented as task vertices in the task dependency graph, and wherein and the plurality of dependencies are represented as dependency edges in the task dependency graph; expanding the task dependency graph to represent the plurality of potential hardware implementations of the plurality of tasks, wherein the task vertices are expanded to represent the plurality of potential hardware implementations; and inserting weights onto the task vertices and the dependency edges to represent the plurality of resource requirements; and generating the device connectivity graph associated with the network topology comprises: generating the device connectivity graph to represent the plurality of nodes in the network topology and the plurality of connections among the plurality of nodes, wherein the plurality of nodes are represented as node vertices in the device connectivity graph, and wherein the plurality of connections are represented as connection edges in the device connectivity graph; expanding the device connectivity graph to represent the plurality of potential hardware devices for implementing the plurality of nodes, wherein the node vertices are expanded to represent the plurality of potential hardware devices; and inserting weights onto the node vertices and the connection edges to represent the plurality of resource capacities.

In one example embodiment of a method, selecting, based on the task dependency graph and the device connectivity graph, the one or more hardware choices from the plurality of potential hardware choices comprises: identifying a deployment objective for the workload, wherein the deployment objective comprises minimizing network resource utilization, minimizing hardware resource utilization, minimizing hardware costs, or minimizing workload latency; identifying a plurality of deployment constraints for the workload, wherein the plurality of deployment constraints are identified based at least partially on the task dependency graph and the device connectivity graph; identifying optimal paths through the task dependency graph and the device connectivity graph, wherein the optimal paths are identified to optimize the deployment objective and satisfy the plurality of deployment constraints; and extracting the one or more hardware choices corresponding to the optimal paths through the task dependency graph and the device connectivity graph.

In one example embodiment of a method, identifying the optimal paths through the task dependency graph and the device connectivity graph comprises: solving an integer linear programming (ILP) model to optimize the deployment objective based on the plurality of deployment constraints, wherein: the plurality of deployment constraints are based at least partially on the plurality of resource requirements from the task dependency graph and the plurality of resource capacities from the device connectivity graph; the ILP model is supplied with a plurality of possible paths through the task dependency graph and the device connectivity graph as input; and the ILP model evaluates the plurality of possible paths to identify the optimal paths that optimize the deployment objective and satisfy the plurality of deployment constraints.

What is claimed is:

1. An apparatus, comprising:
  a communication interface to communicate over a network with a user and one or more hardware providers; and
  a processor to:
    receive, via the communication interface, a workload provisioning request from the user, wherein the workload provisioning request comprises information associated with a workload, a network topology, and a plurality of potential hardware choices for deploying the workload over the network topology;
    receive, via the communication interface, hardware performance information associated with the plurality of potential hardware choices, wherein the hardware performance information is received from the one or more hardware providers;
    generate a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements;
    generate a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities;

select, based on the task dependency graph and the device connectivity graph, one or more hardware choices from the plurality of potential hardware choices; and provision a plurality of resources for deploying the workload over the network topology, wherein the plurality of resources are provisioned based on the one or more hardware choices.

2. The apparatus of claim 1, wherein the processor to generate the task dependency graph associated with the workload is further to:

generate the task dependency graph to represent the plurality of tasks associated with the workload and the plurality of dependencies among the plurality of tasks, wherein the plurality of tasks are represented as graph vertices and the plurality of dependencies are represented as graph edges;

expand the task dependency graph to represent the plurality of potential hardware implementations of the plurality of tasks, wherein the graph vertices corresponding to the plurality of tasks are expanded to represent the plurality of potential hardware implementations; and insert weights onto the graph vertices and the graph edges to represent the plurality of resource requirements.

3. The apparatus of claim 1, wherein the processor to generate the device connectivity graph associated with the network topology is further to:

generate the device connectivity graph to represent the plurality of nodes in the network topology and the plurality of connections among the plurality of nodes, wherein the plurality of nodes are represented as graph vertices and the plurality of connections are represented as graph edges;

expand the device connectivity graph to represent the plurality of potential hardware devices for implementing the plurality of nodes, wherein the graph vertices corresponding to the plurality of nodes are expanded to represent the plurality of potential hardware devices; and insert weights onto the graph vertices and the graph edges to represent the plurality of resource capacities.

4. The apparatus of claim 1, wherein the plurality of potential hardware choices comprise:

the plurality of potential hardware implementations of the plurality of tasks; and the plurality of potential hardware devices for implementing the plurality of nodes.

5. The apparatus of claim 1, wherein the processor to select, based on the task dependency graph and the device connectivity graph, the one or more hardware choices from the plurality of potential hardware choices is further to:

select one or more hardware implementations of the plurality of tasks, wherein the one or more hardware implementations are selected from the plurality of potential hardware implementations; and select one or more hardware devices for implementing the plurality of nodes, wherein the one or more hardware devices are selected from the plurality of potential hardware devices.

6. The apparatus of claim 1, wherein the processor to select, based on the task dependency graph and the device connectivity graph, the one or more hardware choices from the plurality of potential hardware choices is further to:

identify a deployment objective for the workload;

identify a plurality of deployment constraints for the workload, wherein the plurality of deployment constraints are identified based at least partially on the task dependency graph and the device connectivity graph; and identify the one or more hardware choices that optimize the deployment objective and satisfy the plurality of deployment constraints, wherein the one or more hardware choices are identified from the plurality of potential hardware choices based on the task dependency graph and the device connectivity graph.

7. The apparatus of claim 6, wherein the deployment objective comprises:

minimizing network resource utilization;
minimizing hardware resource utilization;
minimizing hardware costs; or
minimizing workload latency.

8. The apparatus of claim 6, wherein the processor to identify the one or more hardware choices that optimize the deployment objective and satisfy the plurality of deployment constraints is further to:

identify optimal paths through the task dependency graph and the device connectivity graph, wherein the optimal paths are identified to optimize the deployment objective and satisfy the plurality of deployment constraints; and extract the one or more hardware choices corresponding to the optimal paths through the task dependency graph and the device connectivity graph.

9. The apparatus of claim 8, wherein the processor to identify the optimal paths through the task dependency graph and the device connectivity graph is further to:

perform directed acyclic graph to directed acyclic graph (DAG-to-DAG) scheduling to select the optimal paths through the task dependency graph and the device connectivity graph, wherein the task dependency graph and the device connectivity graph are each represented as a directed acyclic graph (DAG).

10. The apparatus of claim 8, wherein the processor to identify the optimal paths through the task dependency graph and the device connectivity graph is further to:

solve an integer linear programming (ILP) model to optimize the deployment objective based on the plurality of deployment constraints, wherein:

the plurality of deployment constraints are based at least partially on the plurality of resource requirements from the task dependency graph and the plurality of resource capacities from the device connectivity graph;

the ILP model is supplied with a plurality of possible paths through the task dependency graph and the device connectivity graph as input; and the ILP model evaluates the plurality of possible paths to identify the optimal paths that optimize the deployment objective and satisfy the plurality of deployment constraints.

11. A system, comprising:

a plurality of heterogeneous computing resources associated with a computing environment;

a communication interface to communicate over a network with a user and one or more hardware providers; and a processor to:

receive, via the communication interface, a workload provisioning request from the user, wherein the workload provisioning request comprises information associated with a workload, a network topology, and a plurality of potential hardware choices for deploying the workload over the network topology;

receive, via the communication interface, hardware performance information associated with the plurality of potential hardware choices, wherein the hardware performance information is received from the one or more hardware providers;

generate a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements;

generate a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities;

select, based on the task dependency graph and the device connectivity graph, one or more hardware choices from the plurality of potential hardware choices; and provision a plurality of resources for deploying the workload over the network topology, wherein the plurality of resources are provisioned on the plurality of heterogeneous computing resources based on the one or more hardware choices.

12. The system of claim 11, wherein:

the processor to generate the task dependency graph associated with the workload is further to:

generate the task dependency graph to represent the plurality of tasks associated with the workload and the plurality of dependencies among the plurality of tasks, wherein the plurality of tasks are represented as task vertices in the task dependency graph, and wherein the plurality of dependencies are represented as dependency edges in the task dependency graph;

expand the task dependency graph to represent the plurality of potential hardware implementations of the plurality of tasks, wherein the task vertices are expanded to represent the plurality of potential hardware implementations; and insert weights onto the task vertices and the dependency edges to represent the plurality of resource requirements; and the processor to generate the device connectivity graph associated with the network topology is further to:

generate the device connectivity graph to represent the plurality of nodes in the network topology and the plurality of connections among the plurality of nodes, wherein the plurality of nodes are represented as node vertices in the device connectivity graph, and wherein the plurality of connections are represented as connection edges in the device connectivity graph;

expand the device connectivity graph to represent the plurality of potential hardware devices for implementing the plurality of nodes, wherein the node vertices are expanded to represent the plurality of potential hardware devices; and insert weights onto the node vertices and the connection edges to represent the plurality of resource capacities.

13. The system of claim 11, wherein the processor to select, based on the task dependency graph and the device connectivity graph, the one or more hardware choices from the plurality of potential hardware choices is further to:

identify a deployment objective for the workload, wherein the deployment objective comprises minimizing network resource utilization, minimizing hardware resource utilization, minimizing hardware costs, or minimizing workload latency;

identify a plurality of deployment constraints for the workload, wherein the plurality of deployment constraints are identified based at least partially on the task dependency graph and the device connectivity graph; and identify the one or more hardware choices that optimize the deployment objective and satisfy the plurality of deployment constraints, wherein the one or more hardware choices are identified from the plurality of potential hardware choices based on the task dependency graph and the device connectivity graph.

14. The system of claim 13, wherein the processor to identify the one or more hardware choices that optimize the deployment objective and satisfy the plurality of deployment constraints is further to:

identify optimal paths through the task dependency graph and the device connectivity graph, wherein the optimal paths are identified to optimize the deployment objective and satisfy the plurality of deployment constraints; and extract the one or more hardware choices corresponding to the optimal paths through the task dependency graph and the device connectivity graph.

15. The system of claim 14, wherein the processor to identify the optimal paths through the task dependency graph and the device connectivity graph is further to:

perform directed acyclic graph to directed acyclic graph (DAG-to-DAG) scheduling to select the optimal paths through the task dependency graph and the device connectivity graph, wherein the task dependency graph and the device connectivity graph are each represented as a directed acyclic graph (DAG).

16. The system of claim 14, wherein the processor to identify the optimal paths through the task dependency graph and the device connectivity graph is further to:

solve an integer linear programming (ILP) model to optimize the deployment objective based on the plurality of deployment constraints, wherein:

the plurality of deployment constraints are based at least partially on the plurality of resource requirements from the task dependency graph and the plurality of resource capacities from the device connectivity graph;

the ILP model is supplied with a plurality of possible paths through the task dependency graph and the device connectivity graph as input; and the ILP model evaluates the plurality of possible paths to identify the optimal paths that optimize the deployment objective and satisfy the plurality of deployment constraints.

17. At least one machine accessible storage medium having instructions stored thereon, wherein the instructions, when executed on a machine, cause the machine to:

receive, via a communication interface, a workload provisioning request from a user, wherein the workload provisioning request comprises information associated with a workload, a network topology, and a plurality of potential hardware choices for deploying the workload over the network topology;

receive, via the communication interface, hardware performance information associated with the plurality of potential hardware choices, wherein the hardware performance information is received from one or more hardware providers;

generate a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements;

generate a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities;

select, based on the task dependency graph and the device connectivity graph, one or more hardware choices from the plurality of potential hardware choices; and provision a plurality of resources for deploying the workload over the network topology, wherein the plurality of resources are provisioned based on the one or more hardware choices.

18. The storage medium of claim 17, wherein:
the instructions that cause the machine to generate the task dependency graph associated with the workload further cause the machine to:
  generate the task dependency graph to represent the plurality of tasks associated with the workload and the plurality of dependencies among the plurality of tasks, wherein the plurality of tasks are represented as task vertices in the task dependency graph, and wherein the plurality of dependencies are represented as dependency edges in the task dependency graph;
  expand the task dependency graph to represent the plurality of potential hardware implementations of the plurality of tasks, wherein the task vertices are expanded to represent the plurality of potential hardware implementations; and
  insert weights onto the task vertices and the dependency edges to represent the plurality of resource requirements; and
the instructions that cause the machine to generate the device connectivity graph associated with the network topology further cause the machine to:
  generate the device connectivity graph to represent the plurality of nodes in the network topology and the plurality of connections among the plurality of nodes, wherein the plurality of nodes are represented as node vertices in the device connectivity graph, and wherein the plurality of connections are represented as connection edges in the device connectivity graph;
  expand the device connectivity graph to represent the plurality of potential hardware devices for implementing the plurality of nodes, wherein the node vertices are expanded to represent the plurality of potential hardware devices; and
  insert weights onto the node vertices and the connection edges to represent the plurality of resource capacities.

19. The storage medium of claim 17, wherein the instructions that cause the machine to select, based on the task dependency graph and the device connectivity graph, the one or more hardware choices from the plurality of potential hardware choices further cause the machine to:
  identify a deployment objective for the workload, wherein the deployment objective comprises minimizing network resource utilization, minimizing hardware resource utilization, minimizing hardware costs, or minimizing workload latency;
  identify a plurality of deployment constraints for the workload, wherein the plurality of deployment constraints are identified based at least partially on the task dependency graph and the device connectivity graph;
  identify optimal paths through the task dependency graph and the device connectivity graph, wherein the optimal paths are identified to optimize the deployment objective and satisfy the plurality of deployment constraints; and
  extract the one or more hardware choices corresponding to the optimal paths through the task dependency graph and the device connectivity graph.

20. The storage medium of claim 19, wherein the instructions that cause the machine to identify the optimal paths through the task dependency graph and the device connectivity graph further cause the machine to:
  perform directed acyclic graph to directed acyclic graph (DAG-to-DAG) scheduling to select the optimal paths through the task dependency graph and the device connectivity graph, wherein the task dependency graph and the device connectivity graph are each represented as a directed acyclic graph (DAG).

21. The storage medium of claim 19, wherein the instructions that cause the machine to identify the optimal paths through the task dependency graph and the device connectivity graph further cause the machine to:
  solve an integer linear programming (ILP) model to optimize the deployment objective based on the plurality of deployment constraints, wherein:
    the plurality of deployment constraints are based at least partially on the plurality of resource requirements from the task dependency graph and the plurality of resource capacities from the device connectivity graph;
    the ILP model is supplied with a plurality of possible paths through the task dependency graph and the device connectivity graph as input; and
    the ILP model evaluates the plurality of possible paths to identify the optimal paths that optimize the deployment objective and satisfy the plurality of deployment constraints.

22. A method, comprising:
receiving, via a communication interface, a workload provisioning request from a user, wherein the workload provisioning request comprises information associated with a workload, a network topology, and a plurality of potential hardware choices for deploying the workload over the network topology;
receiving, via the communication interface, hardware performance information associated with the plurality of potential hardware choices, wherein the hardware performance information is received from one or more hardware providers;

generating a task dependency graph associated with the workload, wherein the task dependency graph represents a plurality of tasks associated with the workload, a plurality of dependencies among the plurality of tasks, a plurality of potential hardware implementations of the plurality of tasks, and a plurality of resource requirements;

generating a device connectivity graph associated with the network topology, wherein the device connectivity graph represents a plurality of nodes in the network topology, a plurality of connections among the plurality of nodes, a plurality of potential hardware devices for implementing the plurality of nodes, and a plurality of resource capacities;

selecting, based on the task dependency graph and the device connectivity graph, one or more hardware choices from the plurality of potential hardware choices; and provisioning a plurality of resources for deploying the workload over the network topology, wherein the plurality of resources are provisioned based on the one or more hardware choices.

23. The method of claim 22, wherein:

generating the task dependency graph associated with the workload comprises:
generating the task dependency graph to represent the plurality of tasks associated with the workload and the plurality of dependencies among the plurality of tasks, wherein the plurality of tasks are represented as task vertices in the task dependency graph, and wherein the plurality of dependencies are represented as dependency edges in the task dependency graph;
expanding the task dependency graph to represent the plurality of potential hardware implementations of the plurality of tasks, wherein the task vertices are expanded to represent the plurality of potential hardware implementations; and
inserting weights onto the task vertices and the dependency edges to represent the plurality of resource requirements; and generating the device connectivity graph associated with the network topology comprises:
generating the device connectivity graph to represent the plurality of nodes in the network topology and the plurality of connections among the plurality of nodes, wherein the plurality of nodes are represented as node vertices in the device connectivity graph, and wherein the plurality of connections are represented as connection edges in the device connectivity graph;
expanding the device connectivity graph to represent the plurality of potential hardware devices for implementing the plurality of nodes, wherein the node vertices are expanded to represent the plurality of potential hardware devices; and
inserting weights onto the node vertices and the connection edges to represent the plurality of resource capacities.

24. The method of claim 22, wherein selecting, based on the task dependency graph and the device connectivity graph, the one or more hardware choices from the plurality of potential hardware choices comprises:

identifying a deployment objective for the workload, wherein the deployment objective comprises minimizing network resource utilization, minimizing hardware resource utilization, minimizing hardware costs, or minimizing workload latency;

identifying a plurality of deployment constraints for the workload, wherein the plurality of deployment constraints are identified based at least partially on the task dependency graph and the device connectivity graph;

identifying optimal paths through the task dependency graph and the device connectivity graph, wherein the optimal paths are identified to optimize the deployment objective and satisfy the plurality of deployment constraints; and extracting the one or more hardware choices corresponding to the optimal paths through the task dependency graph and the device connectivity graph.

25. The method of claim 24, wherein identifying the optimal paths through the task dependency graph and the device connectivity graph comprises:

solving an integer linear programming (ILP) model to optimize the deployment objective based on the plurality of deployment constraints, wherein:
the plurality of deployment constraints are based at least partially on the plurality of resource requirements from the task dependency graph and the plurality of resource capacities from the device connectivity graph;
the ILP model is supplied with a plurality of possible paths through the task dependency graph and the device connectivity graph as input; and
the ILP model evaluates the plurality of possible paths to identify the optimal paths that optimize the deployment objective and satisfy the plurality of deployment constraints.

* * * * *